United States Patent [19]

Paton et al.

[11] 4,383,786
[45] May 17, 1983

[54] APPARATUS FOR REMOVING FLASH FROM PIPES

[76] Inventors: Boris E. Paton, ulitsa Chkalova, 41-a, kv. 26; Vladimir K. Lebedev, ulitsa Engelsa, 25, kv. 12; Sergei I. Kuchuk-Yatsenko, ulitsa Filatova, 1/22, kv. 47; Vasily A. Sakharnov, ulitsa Solomenskaya, 41, kv. 93; Boris A. Galian, ulitsa Lenina, 88/92, kv. 110; Grigory B. Asoiants, bulvar Lesi Ukrainki, 2, kv. 16; Mikhail F. Vorobei, ulitsa Stroitelei, 9, kv. 1; Sergei A. Solodovnikov, ulitsa Solomenskaya, 41, kv. 50, all of Kiev, U.S.S.R.

[21] Appl. No.: 199,274

[22] Filed: Oct. 21, 1980

[51] Int. Cl.³ .............................................. B23D 1/08
[52] U.S. Cl. .................................................... 409/299
[58] Field of Search ............... 409/297, 298, 299, 300, 409/301, 307, 140, 143

[56] References Cited

U.S. PATENT DOCUMENTS

| | | | |
|---|---|---|---|
| 2,237,550 | 4/1941 | Darner | 409/299 |
| 2,243,197 | 5/1941 | Fiore | 409/299 |
| 2,778,281 | 1/1957 | Allardt | 409/299 |
| 2,900,879 | 8/1959 | Norton et al. | 409/299 |
| 3,352,208 | 11/1967 | Thomas et al. | 409/299 |
| 3,420,143 | 1/1969 | Nance | 409/299 |
| 4,084,484 | 4/1978 | Shklyanor et al. | 409/143 X |
| 4,251,175 | 2/1981 | Hara et al. | 409/140 |

FOREIGN PATENT DOCUMENTS

| | | | |
|---|---|---|---|
| 1463639 | 2/1977 | United Kingdom | 409/299 |
| 212192 | 11/1968 | U.S.S.R. | 409/299 |
| 468730 | 12/1975 | U.S.S.R. | 409/299 |
| 698726 | 12/1979 | U.S.S.R. | 409/143 |

*Primary Examiner*—William R. Briggs
*Attorney, Agent, or Firm*—Fleit, Jacobson & Cohn

[57] ABSTRACT

An apparatus comprises a body having V-shaped two-arm levers mounted thereon. Around the periphery of the body there are mounted cutting tool holders pivoted each to one arm of each of the levers. Secured to the body are drives for turning the levers and each connected with the other arm of each of the levers. On the front and rear ends of the cutting tool holders there are mounted rollers in contact with the inside surface of the pipe. Rigidly attached to the cutting tool holders are cutting tools.

8 Claims, 4 Drawing Figures

APPARATUS FOR REMOVING FLASH FROM PIPES

BACKGROUND OF THE INVENTION

1. Field of the Invention

The present invention relates to auxiliary welding equipment and particulary to apparatus for removing flash from the inside surface of the weld-joined pipes. Most successfully the invention can be used in laying trunk pipelines as well as in welding casing pipes.

The apparatus for removing flash from the inside surface of the pipes have been used for a comparatively long time. Despite this fact, however, the above apparatus are short-lived and unreliable in operation. Besides, weld-joined pipes are often damaged in the course of removing flash with the aid of such apparatus. The present invention has as its aim to solve this problem and to overcome the above disadvantages.

2. Description of the Prior Art

Known in the art is an apparatus for removing flash (see USSR Inventor's Certificate No. 212,192), comprising a body with a circular cutting tool rigidly attached thereto. The diameter of the cutting tool is somewhat smaller than the inner diameter of the pipe, which enables the apparatus to freely enter the pipe. The body of the apparatus bears up against the inside surface of the pipe through the intermediary of rollers. The cutting edge of the tool is disposed around the periphery thereof. The apparatus removes flash all at once along the whole of the annular weld between the weld-joined pipes.

The above-described apparatus can be used only in those cases when pipes have a diameter of not more than 400 mm and a rigidity sufficiently high to preclude the possibility of any deformation or eccentricity. For welding pipes of a large diameter (more than 700 mm) this apparatus is not fit for use, because in this case ellipticity of the pipes (even under the action of their own weight) and local deformation of their walls (such as dents) are inevitable. Being of a constant diameter, the tool is sure to damage the pipe even before it comes in contact with flash.

More promising in this respect is an apparatus for removing flash from the inside surface of weld-joined pipes, as described in USSR Inventor's Certificate No. 468,730. This apparatus comprises a body and radially movable cutting tool holders disposed around the periphery thereof. The cutting tool holders have supporting members made in the form of protrusions contacting the inside surface of the pipe. Said protrusions are provided only on the front ends of the cutting tool holders. Through its rear end each cutting tool holder is pivoted to the body. Cutting tools are rigidly attached to the cutting tool holders. The apparatus is also provided with springs for pressing the cutting tool holders against the inside surface of the pipe. Although the cutting tool holders are constantly pressed against the inside surface of the pipe, the cutting tools are prevented from cutting into the wall of the pipe when the apparatus moves within the latter by the supporting protrusions which follow the configuration of the inside surface of the pipe and, in conjunction with the springs, turn the cutting tool holder, maintaining a constant space between the cutting tools and the pipe. At the same time the supporting protrusions do not prevent the cutting tool from cutting flash. The flash is a narrow bead; therefore the protrusion passes over it and lowers again, thus permitting the cutting tool to cut the flash.

However, alongside with the advantages, the apparatus under consideration also suffers from some essential drawbacks. In particular, to enable the movement of the apparatus within the pipe, an appreciable force is required to overcome the friction between the protrusions of the cutting tool holders and the pipe walls. In addition, the contacting surfaces of the cutting tool holders wear out rapidly, which is accompanied by an increase in the depth of cutting and may cause either a breakdown of the cutting tools, or a damage of the weld. For this reason, such apparatus need frequent maintenance, and the welds should be thoroughly detected for cracks after the flash has been removed therefrom.

SUMMARY OF THE INVENTION

The principal object of the present invention is to provide an apparatus for removing flash from the inside surface of welded pipes, which enables the cutting tool holders to follow the internal configuration of the pipe and at the same time enables the friction and the wear of the supporting members to be reduced to a minimum.

Another object of the present invention is to provide an apparatus which precludes the possibility of damaging the weld while removing flash.

Still another object of the present invention is to provide an apparatus for removing flash from the inside surface of welded pipes, which is capable of operating for a comparatively longer period of time without repairs.

Yet another important object of the present invention is to facilitate the movement of the apparatus for removing flash within pipes.

An additional object of the present invention is to reduce the power consumption and the engine power for the movement of the apparatus for removing flash within welded pipes.

These and other objects of the present invention are attained in an apparatus for removing flash from the inside surface of welded pipes, comprising a body, radially movable cutting tool holders mounted around the periphery of the body and having supporting members in contact with the inside surface of a pipe, cutting tools rigidly attached to said cutting tool holders, and means for pressing the cutting tool holders against the pipe, wherein, according to the invention, on the body there are mounted V-shaped two-arm levers and one arm of each of the levers pivotally carries a cutting tool holder, whereas the other arm is connected with a drive for turning the lever and secured to the body and serving as a means for pressing the cutting tool holder against the pipe, the supporting member being made in the form of rollers mounted on the front and the rear ends of the cutting tool holders.

Such an arrangement allows the cutting tool holders to be in spaced relationship with the pipe when the apparatus is in the transport position and makes it possible to substitute the sliding friction of the supporting members by the rolling friction when the apparatus is in the operating position, thereby appreciably facilitating the apparatus movement within the pipe. At the same time, this decreases the wear of the supporting members (rollers) and permits the period between repairs to be increased several times. The abrasive wear in the apparatus of the present invention is so insignificant that any dangerous increase in the cutting depth is practically excluded. Thus the total combination of features of the apparatus of the present invention makes it possible to attain a novel result, namely to increase the period between repairs several times as compared with that similar conventional apparatus, to appreciably reduce the power consumption and engine power required for the movement of the apparatus within pipes, and to substantially rule out the possibility of damaging of the pipe walls and weld in the course of flash removal.

The simplest in construction and most reliable in operation is such a modification of the apparatus wherein said drive for turning each lever is made in the form of a power cylinder pivoted to the arm of the lever and to the body.

It is advisable that the roller mounted on the front end of each cutting tool holder be wider than the cutting tool held in this cutting tool holder. This makes it possible to prevent a contact between the cutting tool and the pipe even if the latter is considerably elliptical, or if there are dents on the pipe. At the same time this structural feature prevents the possibility of contact between the cutting tool and a longitudinal weld.

When using the apparatus under consideration for removing flash from casing pipes and from small-diameter pipes, it is necessary that the rollers mounted on the front ends of the cutting tool holders be tapering to their ends. This structural feature enhances the accuracy of following the configuration of the inside surface of the pipe by the rollers.

This very result can be achieved by a modification of the apparatus wherein the cutting tool holders are mounted on V-shaped two-arm levers by means of gimbal joints.

BRIEF DESCRIPTION OF THE DRAWINGS

Now the invention will be described by way of specific embodiments thereof with reference to the accompanying drawings wherein.

DETAILED DESCRIPTION OF THE INVENTION

Figure 1:
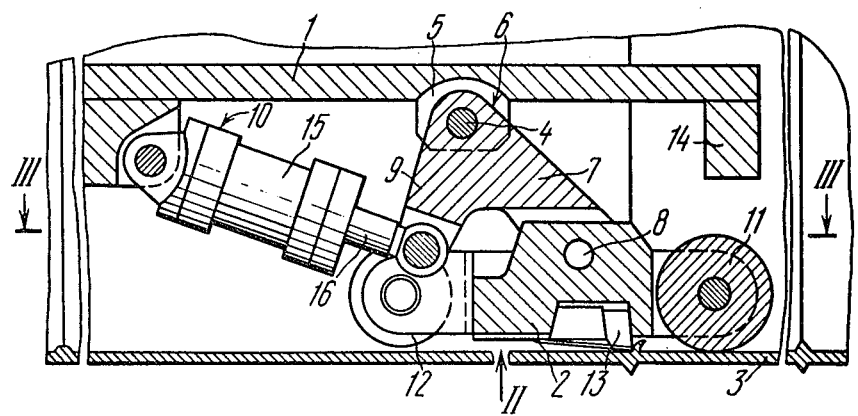
FIG. 1 is an elevational view of an apparatus for removing flash from the inside surface of welded pipes, according to the invention.

An apparatus for removing flash from the inside surface of welded pipes comprises a body 1 (FIG. 1), a drive for moving the apparatus, and supporting wheels (not shown). Around the periphery of the body 1 there are mounted radially movable cutting tool holders 2. Since all the cutting tool holder 2 are similar in construction, FIG. 1 shows only one cutting tool holder 2, a portion of the body 1, and a wall of a welded pipe 3.

On the body 1 there are mounted V-shaped two-arm levers 6 by means of cylindrical pivots 4 and 5. One arm 7 of each of the levers 6 carries one cutting tool holder 2 by means of a pivot 8. The other arm 9 of each lever 6 is pivotally connected with a drive 10 for turning this lever 6. The drive 10 is mounted on the body 1 and serves as a means for pressing the cutting tool holder 2 to the pipe 3. Each cutting tool holder 2 has supporting members which in the operating position are in contact with the inside surface of the welded pipe 3. The supporting members are made in the form of rollers 11 and 12 mounted on the front end and the rear end of each cutting tool holder 2. Cutting tools 13 are rigidly fixed to the cutting tool holders 2.

On the body 1 there are provided stops 14 disposed opposite the front ends of the cutting tool holders 2.

The simplest in construction and most reliable in operation is a modification of the apparatus wherein each drive 10 for turning the respective lever 6 is made in the form of a power cylinder 15. A rod 16 of the power cylinder 15 is pivotally connected with the arm 9 of the lever 6. The power cylinder 15 is pivotally connected to the body 1. All the power cylinders 15 are connected with a hydraulic control system or a pneumatic control system (not shown).

Figure 2:
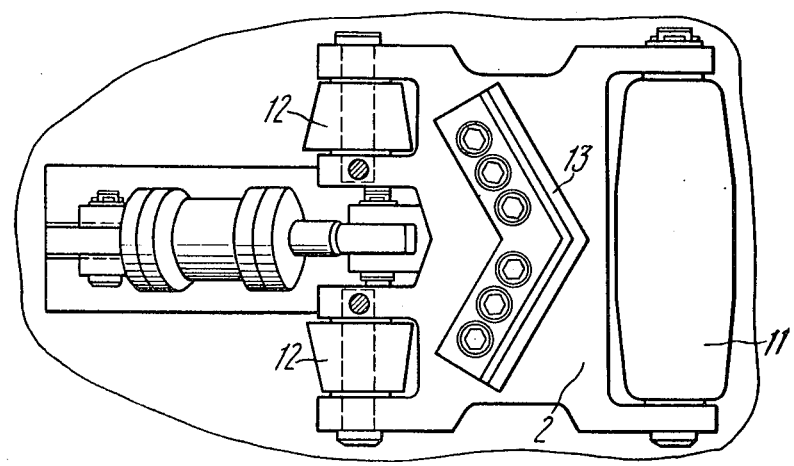
FIG. 2 is the apparatus of the present invention as viewed in the direction of arrow II in FIG. 1, without showing the pipes being welded.

According to the preferred embodiment of the invention shown in FIG. 2 the apparatus has one roller 11 mounted on the front end of each cutting tool holder 2 and two rollers 12 mounted on the rear end of this same cutting tool holder 2.

The roller 11 mounted on the front end of each cutting tool holder 2 is, according to the invention, wider than the cutting tool 13 held in this cutting tool holder 2. Each such roller 11 is tapering to its ends.

The rollers 12 mounted on the rear ends of the cutting tool holders are conical.

Figure 3:
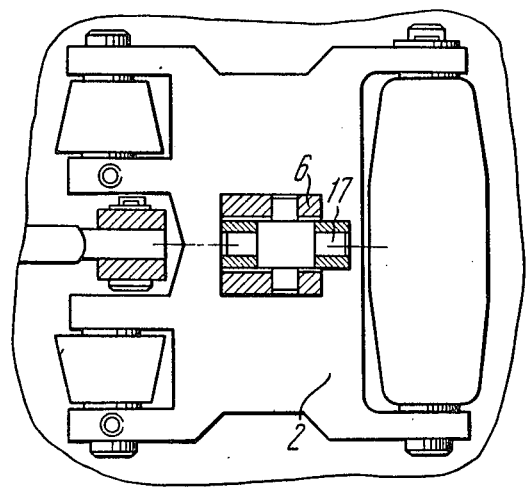
FIG. 3 is a section of the apparatus of the present invention, taken along line III—III in FIG. 1.

For more accurate following the configuration of the inside surface of the pipe 3 by the rollers, each cutting tool holder 2, according to one of preferred embodiments of the invention (FIG. 3) is mounted on the respective V-shaped two-arm lever 6 by means of a gimbal joint 17. This mounting is illustrated in FIG. 4 where the cutting tool holder 2 is shown in the transport position.

The above-described apparatus operates in the following way.

Figure 4:
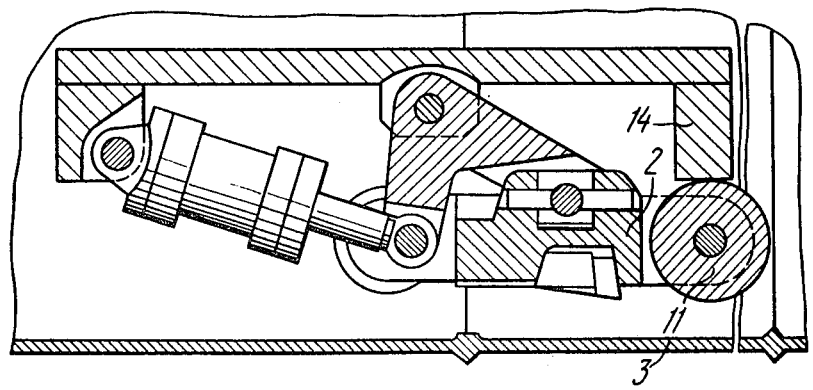
FIG. 4 is an elevational view of the apparatus of the present invention at the moment of transportation.

The drives 10 (FIG. 1) such as power cylinders 15, turn the levers 6 so that the cutting tool holders 2 occupy the transport position shown in FIG. 4. In this position the roller 11 of each cutting tool holder 2 is pressed against the respective stop 14. With the aid of a drive incorporated in the apparatus or disposed outside of the pipe 3 the apparatus is moved to the weld covered with flash. Some distance from the weld to be treated the apparatus is stopped.

The drives 10, such as the power cylinders 15, turn the levers 6 so that the cutting tool holders 2 move radially to the inside surface of the pipe 3 (see FIG. 1) until the rollers 11 come into contact with the pipe 3. Then the apparatus is moved to the weld to be treated. The drive (not shown) moving the apparatus overcomes but a slight resistance caused by the rolling friction of the supporting wheels (not shown) and the rollers 11. If there are deformed portions on the walls of the pipe 3, such as dents forming bulges on the inside surface of the pipe 3, the roller 11 rolls over such a bulge, turns the cutting tool holder 2 about the pivot 8 and thereby diverts the cutting edge of the cutting tool 13 from the deformed portion of the pipe wall. When the cutting tool holder 2 turns, the rear rollers 12 of this cutting tool holder 2 come into contact with the non-deformed portion of the pipe 3.

In this way the cutting tool holder 2 rolls over the deformed portion of the pipe 3 so that the cutting tool 13 does not damage the pipe wall.

Having approached the weld to be treated, the apparatus moves on, and the rollers 11 turn the cutting tool holders 2 and roll over the flash.

It will be understood that even with a considerable ellipticity of the pipe 3 none of the cutters 13 will damage the pipe wall because each roller 11 is, according to the preferred embodiment of the invention, wider than the respective cutting tool 13.

If the pipe 3 is locally deformed close to the weld, the apparatus makes it possible to properly remove the flash from the adjacent sections of the weld without damaging the deformed portion of the pipe. In particular, the roller 11 (see FIG. 3) rolls over the locally deformed portion of the pipe 3 and thereby causes the respective cutting tool holder 2 to turn relative to two mutually perpendicular axes, one of which axes coincides with the direction of the apparatus movement, whereas the other is perpendicular thereto. As a result, the portion of the cutting tool 13 disposed behind this roller 11 will pass over the deformed portion of the pipe 3 and will cut off the flash therefrom, whereas the other portion of the cutting tool 13 will cut off the flash in proximity to the locally deformed portion.

As soon as the flash is removed, the drives 10, such as power cylinders 15 (FIG. 1), operate and turn the levers 6 so that the cutting tool holders 2 occupy the transport position shown in FIG. 4.

The apparatus moves out of the pipe.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

We claim:

1. An apparatus for removing flash from the inside surface of welded pipes, comprising:
   a body;
   a plurality of V-shaped two-arm levers mounted on said body;
   a plurality of cutting tool holders disposed around the periphery of said body and pivoted each to one arm of one of said levers;
   drives for turning said levers mounted on said body and each connected with the other arm of respective ones of said levers;
   rollers mounted on the front and the rear ends of said cutting tool holders and being movable into and out of contact with the inner surface of the pipe; and
   cutting tools rigidly attached to said cutting tool holders.

2. An apparatus as claimed in claim 1, wherein said drive for turning said lever is made in the form of a power cylinder pivoted to said arm of said lever and to said body.

3. An apparatus as claimed in claim 1, wherein said roller mounted on the front end of each cutting tool holder is wider than said cutting tool held in this cutting tool holder.

4. An apparatus as claimed in claim 3, wherein said rollers mounted on the front ends of said cutting tool holders are tapering to their ends.

5. An apparatus as claimed in claim 3, wherein said cutting tool holders are mounted on said V-shaped two-arm levers by means of gimbal joints.

6. An apparatus for removing flash from the inside surface of welded pipes, comprising:
   a body;
   a V-shaped two-arm lever mounted on said body;
   a cutting tool holder;
   a gimbal joint pivotally mounting said cutting tool holder on one arm of said lever;
   drive means for turning said lever mounted on said body and connected with a second arm of said lever;
   rollers mounted on the front and the rear ends of said cutting tool holder and being movable into and out of contact with the inner surface of the pipe; and
   a cutting tool rigidly attached to said cutting tool holder for removing flash, said roller mounted on the front end of said cutting tool holder being wider than said cutting tool held in said cutting tool holder.

7. An apparatus for removing flash from the inside surface of welded pipes, comprising:
   a body;
   a plurality of V-shaped two-arm levers mounted on said body;
   a plurality of cutting tool holders disposed around the periphery of said body, one of said cutting tool holders being pivoted to one arm of respective ones of said levers;
   a plurality of drives for turning said levers mounted on said body, one of said drives being connected with a second arm of respective ones of said levers;
   rollers mounted on the front and the rear ends of said cutting tool holders, said levers supporting said cutting tool holders in such manner that the front roller is in contact with the inner surface of the pipe and the rear roller is spaced from the inner surface during normal flash removal, the rear roller being moved into contact with the inner surface when the front roller contacts a deformed portion of the pipe and is moved toward the center of the pipe; and
   cutting tools attached to said cutting tool holders for removing flash.

8. An apparatus as claimed in one of claims 1, or 7, wherein said cutting tools have a generally V-shape, with the apex of the V being positioned close to the front roller and outer edges being positioned close to the rear roller.

* * * * *